United States Patent
Balbach

(10) Patent No.: US 10,304,307 B2
(45) Date of Patent: May 28, 2019

(54) SENSOR FOR DETECTING OBJECTS IN A MONITORING AREA

(71) Applicant: Leuze electronic GmbH + Co. KG, Owen/Teck (DE)

(72) Inventor: Ulrich Balbach, Stuttgart (DE)

(73) Assignee: Leuze electronic GmbH + Co. KG, Owen/Teck (DE)

( * ) Notice: Subject to any disclaimer, the term of this patent is extended or adjusted under 35 U.S.C. 154(b) by 50 days.

(21) Appl. No.: 14/821,701

(22) Filed: Aug. 8, 2015

(65) Prior Publication Data
US 2016/0086469 A1    Mar. 24, 2016

(30) Foreign Application Priority Data

Sep. 23, 2014 (DE) .................... 20 2014 104 531 U

(51) Int. Cl.
| | |
|---|---|
| G08B 21/08 | (2006.01) |
| G08B 21/02 | (2006.01) |
| G01V 8/20 | (2006.01) |
| F16P 3/14 | (2006.01) |
| G09G 3/00 | (2006.01) |
| G09G 3/32 | (2016.01) |

(52) U.S. Cl.
CPC .............. *G08B 21/02* (2013.01); *F16P 3/144* (2013.01); *G01V 8/20* (2013.01); *G09G 3/005* (2013.01); *G09G 3/32* (2013.01)

(58) Field of Classification Search
CPC ........... G08B 21/02; F16P 3/144; G01V 8/20; G09G 3/005; G09G 3/32
See application file for complete search history.

(56) References Cited

U.S. PATENT DOCUMENTS

| | | | |
|---|---|---|---|
| 6,265,984 B1* | 7/2001 | Molinaroli | A63H 33/40 340/815.4 |
| 6,856,303 B2* | 2/2005 | Kowalewski | G09G 3/005 345/108 |
| 2002/0093951 A1* | 7/2002 | Rupp | G05B 9/03 370/362 |
| 2005/0174308 A1* | 8/2005 | Matlock | G09G 3/005 345/82 |
| 2010/0157173 A1* | 6/2010 | Wang | G08B 13/19619 348/744 |

OTHER PUBLICATIONS

Translation of DE 102011054247.*

* cited by examiner

*Primary Examiner* — Patrick N Edouard
*Assistant Examiner* — Eboni N Hughes
(74) *Attorney, Agent, or Firm* — Michael Soderman

(57) ABSTRACT

The invention relates to a sensor for detecting objects in a monitoring area. The sensor has a display unit that is comprised of a series of lamps with a linear arrangement of lamps. The series of lamps is arranged around an axis of rotation running parallel to its longitudinal axis and rotates at a specific rotary speed. The series of lamps is controlled via a control unit in such a way that the columns of a matrix-type display field to be presented at a clock rate of the display field are individually output one after the other to the series of lamps and displayed with it. The clock rate is adapted to the rotary speed in such a way that these displays complement one another to form a standing image of the display field. The sensor is a safety sensor.

16 Claims, 5 Drawing Sheets

SENSOR FOR DETECTING OBJECTS IN A MONITORING AREA

CROSS-REFERENCE TO RELATED APPLICATIONS

This application claims the benefit under 35 USC 119 of German Application No. DE 20 2014 104 531.7 filed on Sep. 23, 2014; this application is incorporated by reference herein in its entirety.

BACKGROUND

The invention relates to a sensor for detecting objects in a monitoring area.

Sensors of that type can be designed in the form of optical sensors, in particular, that are generally used to detect objects.

Sensors of that kind have suitable display units to display status messages, warning messages or the like. In the simplest case, such a display unit is comprised of a single LED, which emits a flashing or permanent light signal when a warning message is to be delivered, as an example.

The requirements on the display units are also rising along with the increasing functional scope of the sensors to the effect that complex text messages or even graphics have to be output with them. The use of single or multi-digit seven-segment displays for outputting text messages in the form of alphanumeric characters is well known. The integration of seven-segment displays of that type leads to undesirably high levels of engineering work and costs, however. Moreover, the display possibilities of the seven-segment displays for representing individual alphanumeric characters are limited.

A sensor for detecting objects in a monitoring area is known from DE 10 2011 054 247; it has a display unit that is comprised of a series of lamps with a linear configuration of lamps arranged so as to rotate around an axis of rotation running in parallel to its longitudinal axis. The series of lamps is controlled via a control unit in such a way that the columns of a matrix-type display field to be shown are individually output one after the other to the series of lamps at the clock rate of the display field and displayed with the series; the clock rate is adapted to the rotary speed in such a way that these displays complement one another to form a standing image of the display field.

SUMMARY

The invention relates to a sensor for detecting objects in a monitoring area. The sensor has a display unit that is comprised of a series of lamps (13) with a linear arrangement of lamps. The series of lamps is arranged around an axis of rotation (D) running parallel to its longitudinal axis and rotates at a specific rotary speed. The series of lamps (13) is controlled via a control unit in such a way that the columns of a matrix-type display field (18) to be presented at a clock rate of the display field are individually output one after the other to the series of lamps (13) and displayed with it. The clock rate is adapted to the rotary speed in such a way that these displays complement one another to form a standing image of the display field (18). The sensor is a safety sensor.

DETAILED DESCRIPTION

The invention is based on the objective of expanding the functionality of a sensor of the type specified at the outset.

The elements of claim 1 are specified to solve this problem. Advantageous embodiments and useful design developments of the invention are described in the sub-claims.

The sensor is designed in accordance with the invention to be a safety sensor, meaning it has a structure fulfilling the applicable safety standards, which makes the sensor suitable for use in the area of safety engineering.

The safety sensor advantageously has a redundant design that permits error monitoring and that therefore brings about the error protection required by the safety standards.

The safety sensor has, as an advantage, a redundantly designed control and evaluation unit for this in which sensor signals generated by a transmitter/receiver unit are evaluated.

The required error protection of the safety sensor is achieved with the redundantly designed control and evaluation unit, which is comprised, as an example, of two computer units that mutually monitor one another on a cyclical basis.

Reliable object monitoring is ensured with the safety sensor designed in that way. In particular, danger zones in plants can thereby be monitored with the safety sensor.

As a particular advantage, a switching signal is generated in the form of an output signal in the transmitter/receiver unit; the switching states of the switching signal indicate whether an object is located in a protected field or not.

It is useful when the protected field includes a danger zone in a plant. The plant is then controlled via the switching signal in such a way that it is only in operation when an object has not been detected in the protected field, but the plant will be shut off when an object enters the protected field.

A warning signal whose switching states indicate whether an object is located in a warning zone or not is additionally and advantageously generated in the control and evaluation unit in the form of a safe output signal.

Whereas the protected field includes the danger zone of a pant, the warning zone is preferably connected to this danger zone. If an object is then detected in the warning zone with the safety sensor, the plant does not have to be shut down; rather, the issuance of a signal for warning purposes is sufficient.

In accordance with the invention, the display unit is also controlled by the control and evaluation unit in order to display suitable information there.

In the case that information relevant to safety is to be displayed with the display unit, it is especially useful for the control and evaluation unit to generate safe output signals to control the display unit.

An error-protected display of this information is ensured because of that.

In particular, an entry of objects into the protected field and/or in the warning zone can be displayed in the process as information relevant to safety.

An entry of objects can be presented with symbols or pictograms for this.

Furthermore, the position of an object relative to the protected field or the warning zone can be displayed with the display unit.

A graphical representation of the protected field and/or the warning zone is provided with the display unit, in particular, and an entry of objects is visually displayed there.

The content of a matrix-type display field is not displayed with a matrix-type arrangement of lamps with the display unit as per the invention. Rather, a linear series of lamps alone is used for the display. A matrix-type display field is displayed with only one series of lamps by feeding the information of the individual columns of the display field to be displayed, individually one after the other at a clock rate, to the series of lamps and displaying it with the series of lamps in that way. Since the series of lamps rotates at a specific rotary speed that is adapted to the clock rate, the series of lamps is always offset by a certain angle of rotation vis-a-vis the display of the previous column when a certain column is displayed. Because of the coordination of the rotary speed and the clock rate, a standing image arises in the process for the human eye that is made up of the individual columns, meaning that the entire matrix-type display field is visible as a two-dimensional image.

The construction expenses for the display unit can be kept low because only one series of lamps is required to display this image. Furthermore, it is advantageous that complex structures with numbers, letters and/or graphics can be displayed with the display unit as per the invention, meaning that the display unit as per the invention has a high level of functionality.

The display unit can, on the one hand, display information in a standing image here. Alternatively, the display unit can also be designed to display moving text, i.e. information, especially text, that moves along.

The clock rate is a whole-number multiple of the rotary speed to generate a standing, flicker-free image with the individual displays of the series of lamps.

The resolution of the matrix-type image is defined in a first spatial direction by the number of individual lamps of the series of lamps. The resolution in the second spatial direction depends on the clock rate at which the series of lamps is driven.

In accordance with an especially simple embodiment of the invention in terms of the design, one lamp of the series of lamps is made up of a single light-emitting diode.

In that case, a single-color display of information is obtained.

In accordance with a second advantageous embodiment of the invention, one lamp of the series of lamps is made up of red, green and blue light-emitting diodes.

The blue, red and green light-emitting diodes of each lamp can be separately driven by the control unit, so a color display is possible over the entire display field.

In accordance with an especially advantageous embodiment of the invention, the series of lamps of the display unit rotates together with the transmitter/receiver unit of the safety sensor around one axis of rotation.

The rotation mechanism for the transmitter/receiver unit of the sensor can therefore also be used for the rotational movement of the series of lamps, i.e. a separate rotation mechanism does not have to be provided for the series of lamps, and the construction expenses for realizing the display unit can be significantly reduced because of that.

It is especially advantageous when the transmitter/receiver light unit and the series of lamps are integrated into a sensing head that rotates around the axis of rotation. The sensor is integrated into a housing; the series of lamps is built into the housing.

The display unit can be integrated into the sensor so as to save an extremely large amount of space because of the integration of the series of lamps in the sensing head.

Furthermore, the display field displayed with the series of lamps is visible through the housing.

The housing consequently has two functions because it is additionally used as a display surface; the construction expenses for the display unit are further reduced because of that. Moreover, it is advantageous that the housing makes a large-area display of information possible; the field of the display can extend over the full angular range of 360° or portions thereof that can be flexibly selected.

BRIEF DESCRIPTION OF THE DRAWINGS

The invention will be explained with the aid of the drawings below. The following are shown in the figures.

DETAILED DESCRIPTION OF THE PREFERRED EMBODIMENTS

Figure 1:
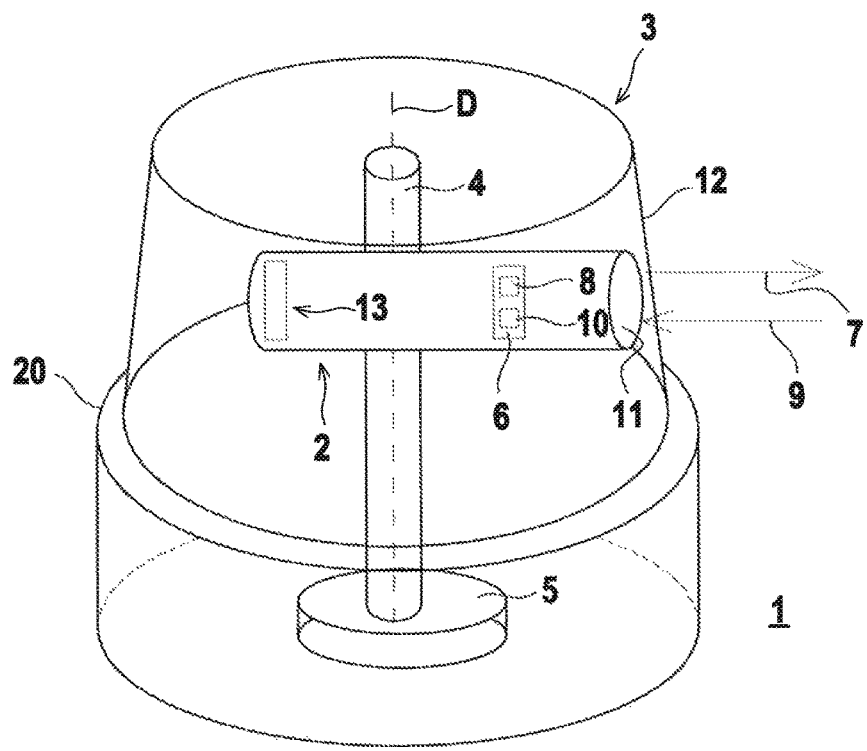
FIG. 1: Schematic diagram of an optical sensor with a display unit integrated there.

FIG. 1 shows a schematic diagram of the structure of an optical sensor 1 for object detection in a monitoring area. The optical sensor 1 has a sensing head 2 that can rotate around a vertical axis of rotation D and that is arranged in a locally fixed, meaning not also rotating, housing 3. The housing 3 is made up of a rotationally symmetrical hollow body. The sensing head 2 is mounted on a shaft 4 running along the axis of rotation D that is rotated by a drive unit 5. It rotates at a consent rotary speed during the object detection carried out by the sensing head 2. The rotary speed in this case is 25 Hz. The current rotational position of the sensing head 2 is detected with a sensing device, especially an angle sensing device.

A transmitter/receiver unit 6 that constitutes an optical distance sensor element is integrated into the sensing head 2. The distance measurements carried out with the transmitter/receiver unit 6 take place according to a light travel time process. The transmitter/receiver unit 6 is comprised of a transmitter 8 in the form of a laser diode emitting a transmitter light beam 7. The transmitter optics unit, which is not separately shown, can be arranged directly downstream from the laser diode in the beam direction of the transmitter light beam 7. The transmitter/receiver unit 6 further comprises a receiver 10 receiving a receiver light beam 9 in the form of a photodiode or the like. A receiver optics unit 11 in the form of a lens is arranged in front of the receiver 10. In general, the receiver optics unit 11 can also be designed in the form of reflecting optics.

As evident from FIG. 1, the transmitter light beams 7 and the receiver light beams 9 are routed through a transparent section of the housing 3 that forms a window 12. The window 12 extends around the circumference of the housing 3 by the full angular range of 360°. The transmitter light beams 7 are periodically led through the entire angular range of 360° by the rotational movement of the sensing head 2, so this range also forms the monitoring range in which objects can be detected. The precise object positions can be determined via the distance measurement and the simultaneous detection of the current rotational position of the sensing head 2.

The evaluation required for this is carried out in a control and evaluation unit. The optical sensor is designed as a safety sensor in accordance with the invention. The control and evaluation unit has a redundant and therefore error-protected structure to meet the normative requirements for use in the area of safety engineering. As an example, the control and evaluation unit is comprised of two computer units that mutually monitor one another on a cyclical basis.

An error-proof evaluation of sensor signals generated in the transmitter/receiver unit takes place in the control and evaluation unit designed in that way, and safe output signals are generated in dependence upon them and output via error-proof, especially dual-channel outputs that are not shown.

Danger-zone monitoring typically takes place with the safety sensor for a system like a machine, a vehicle or the like; the system is controlled in dependence upon the output signals of the safety sensor.

Figure 1A:
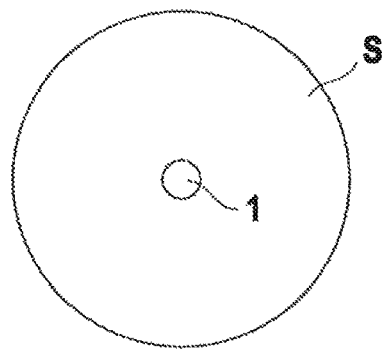
FIG. 1*a*: Diagram of a protected field monitored with the optical sensor in accordance with FIG. 1.

In accordance with a first variant, a protected field S that includes the danger zone in the plant and that extends around the safety sensor is monitored with the safety sensor, as shown in FIG. 1a. A switching signal with which the plant is controlled is generated in the control and evaluation unit in dependence upon the object detection in the protected field S. If no object is detected in the protected field, the switching signal takes on a switching state that enables the operation of the plant. If, in contrast, an object is detected in the protected field, the switching signal takes on a switching state that shuts down the plant to avoid dangerous situations.

Figure 1B:
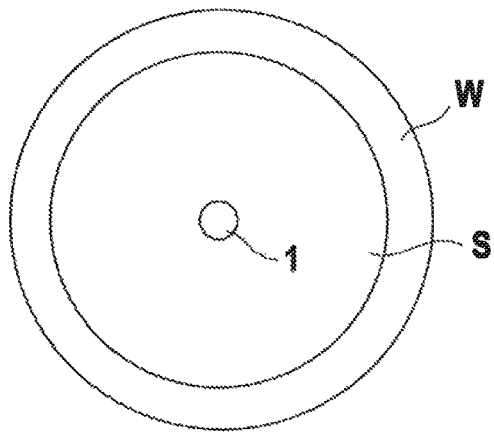
FIG. 1*b*: Diagram of a protected field and warning zone monitored with the optical sensor in accordance with FIG. 1.

Alternatively, a warning zone W adjoining the protected field S, in addition to the protected field S, can be monitored with this safety sensor, as shown in FIG. 1b. An entry of an object into the warning zone W is not yet immediately dangerous, so the plant does not yet have to be shut down. An entry of an object does mean that there is a directly imminent dangerous situation, though, because the object in the warning zone W is coming closer to the protected field. A warning signal is therefore generated with the safety sensor in the form of a safe output signal.

The optical sensor 1 includes a display unit for displaying status messages, warning messages, danger messages and other information relating to the optical sensor 1.

The display unit is controlled by the control and evaluation unit, so the information that is displayed by the display unit is specified by the control and evaluation unit.

In principle, unsafe output signals of the control and evaluation unit can be used to control the display unit. As a special advantage, however, the control and evaluation unit generates safe output signals, so information is provided in an error-proof display. An error-proof display can be realized via a dual-channel output of the output signals, as an example. An error-proof display is especially useful when displaying information relevant to safety.

The display unit has a series of lamps 13 that is built into the end of the sensing head 2 opposite the transmitter/receiver unit 6. Because of the integration in the sensing head 2, the series of lamps 13 rotates along with the transmitter/receiver unit 6, meaning that the series of lamps 13 also rotates around the axis of rotation D at the rotary speed specified by the drive unit 5.

Figure 2:
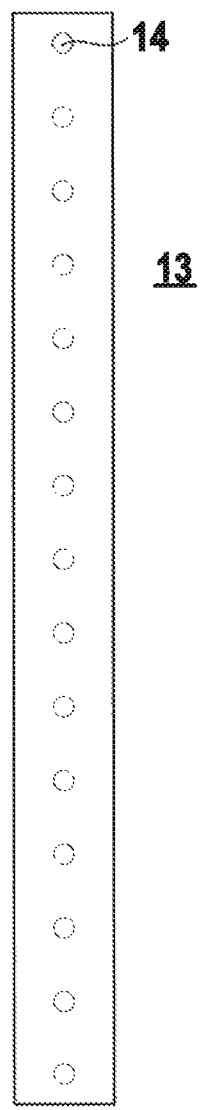
FIG. 2: First embodiment of a series of lamps of the display unit.
Figure 3:
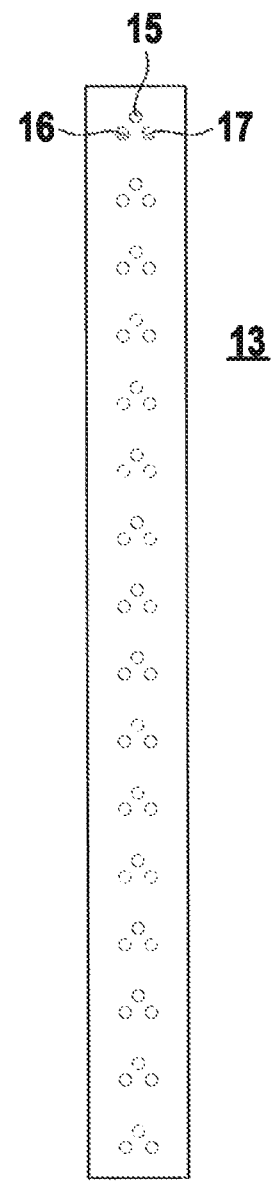
FIG. 3: Second embodiment of a series of lamps of the display unit.

FIGS. 2 and 3 show two embodiments of a series of lamps 13 of that type. Each series of lamps 13 is comprised of a linear arrangement of lamps designed to be identical in each case that are controlled by a control unit that is not shown. A series of lamps 13 has sixteen lamps in the embodiments that are shown.

Each lamp is comprised of a single light-emitting diode 14 in the embodiment in accordance with FIG. 2. A single-color display of information is made possible because of that.

In the embodiment in accordance with FIG. 3, each lamp is comprised of a multiple arrangement of light-emitting diodes made up of a red LED 15, i.e. a light-emitting diode 14 emitting red light, a blue LED 16, i.e. a light-emitting diode 14 emitting blue light, and a green LED 17, i.e. a light-emitting diode 14 emitting green light. Multi-color displays can be realized with this series of lamps 13.

Figure 4:
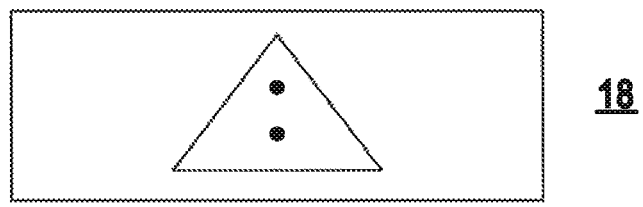
FIG. 4: Display field generated with a series of lamps in accordance with FIG. 2 or 3.
Figure 5:
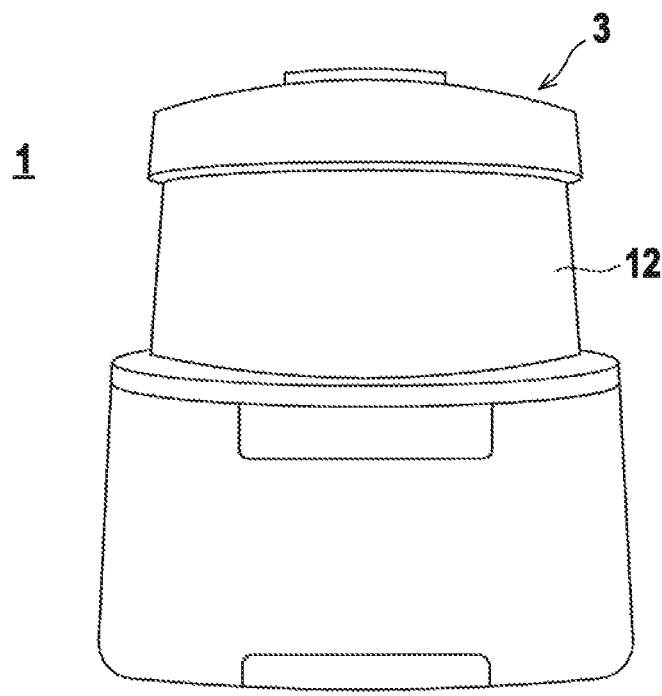
FIG. 5: Top view of the optical sensor according to FIG. 1 with the display field in accordance with FIG. 4 displayed at the housing.

Although the series of lamps 13 forms a linear structure, meaning a one-dimensional structure, a matrix-type display field 18, as shown in the form of an example in FIG. 4, an be displayed with it.

This matrix-type display field 18 contains, as information to be displayed, a warning symbol in the form of a pictogram that signals the entry of an object into the warning zone monitored by the safety sensor.

The matrix-type display field 18 is comprised of a matrix of N rows and M columns. It is important that the number N of rows corresponds to the number of lamps of the series of lamps 13.

The series of lamps 13 is controlled by the control unit in such a way that the content of the individual columns of the display field 18 are output to the lamps of the series of lamps 13 at the specified clock rate and therefore displayed with them. This means that the first column of the display field 18 is displayed with the series of lamps 13 in a first step and, in fact, the pixel of the first row with the first lamp, the pixel of the second row with the second lamp etc.

All of the columns of the display field 18 are displayed one after the other with the series of lamps 13 in that way in correspondence with the clock rate.

The series of lamps 13 is arranged right behind the interior of the window 12 of the housing 3 in the process, so its lamps are visible through the window 12. The window 12 therefore forms a display area in which the display generated by the series of lamps 13 is visible.

Because of the rotational movement of the series of lamps 13, the series of lamps 13 moves on by a certain angle between the points in time of two displays following one after the other.

The clock rate here is adapted to the rotary speed of the series of lamps 13 here in such a way that the clock rate is a whole-number multiple of the rotary speed.

Because of this specification, a standing image arises for the viewer that is comprised of instances of content individually displayed one after the other with the series of lamps 13. This means, because of the rotation of the series of lamps 13 and the sequential clocking of the series of lamps 13, that a standing image of the content of the matrix-type display field 18 arises that is visible in the window 12, as shown in FIG. 4.

The pictogram in accordance with FIG. 4 represents a first example of a display of information relevant for safety.

Figure 6:
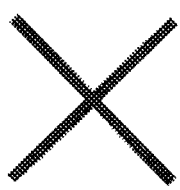
FIG. 6: Pictogram shown in the display field when an object enters the protected field.

FIG. 6 shows, as a second example of information relevant for safety that can be displayed in the display unit, a pictogram that indicates the entry of an object into the protected field.

The entry of an object into the protected field or into the warning zone can also be displayed with a symbol in the form of a hand, for instance; the hand can appear permanently or in a flashing manner in the display field depending on the position of the object in the protected field or warning zone. The position or direction of motion of the object can also be signaled by a particular orientation or direction of motion of the hand shown in the display field.

Figure 7:
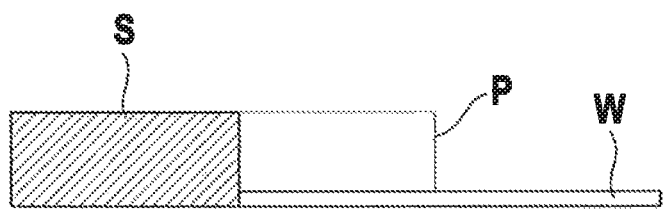
FIG. 7: First embodiment of a spatially resolved display for object detection.

FIG. 7 shows a first embodiment of a location-dependent display of entries of objects into the protected field or warning zone. The extensions of the protected field S and the warning zone W in the radial direction are displayed with highlighted fields. Furthermore, the current object position P of an object that is in the warning zone in this case is displayed. The display is preferably time-dependent, so this can be used to monitor whether the object is coming closer to the protected field or moving away from it. An operator can already do a precise analysis of possible danger situations in advance with the aid of this display.

Figure 8:
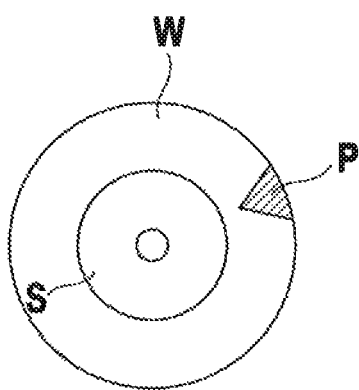
FIG. 8: Second embodiment of a spatially resolved display for object detection.
Figure 9:
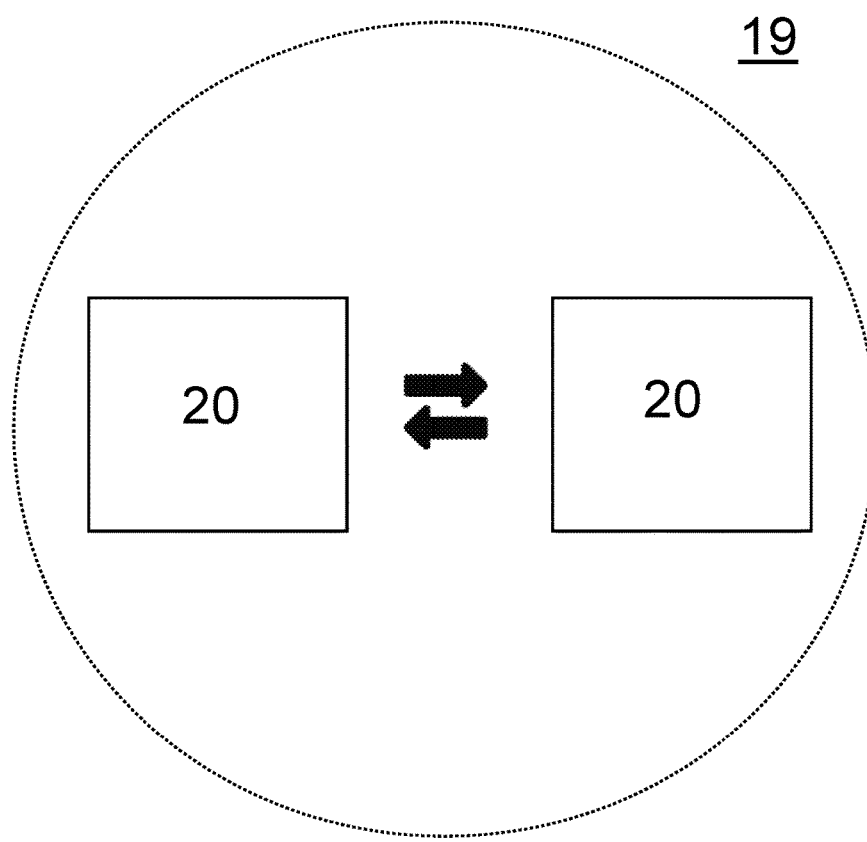
FIG 9: Computer units in the control and evaluation unit.

FIG. 8 shows a further embodiment of a location-dependent display of entries of objects into the protected field or warning zone. In this case, the protected field and the warning zone are shown in a top view. The entry of an object is presented as a graphical field, in particular a field highlighted in color, that signals the object position P. The current object position P is also presented in a time-dependent fashion here, analogously to the embodiment in accordance with FIG. 7.

LIST OF REFERENCE NUMERALS (1) Optical sensor
(2) Sensing head
(3) Housing
(4) Shaft
(5) Drive unit
(6) Transmitter/receiver unit
(7) Transmitter light beam
(8) Transmitter
(9) Receiver light beam
(10) Receiver
(11) Receiver optics unit
(12) Window
(13) Series of lamps
(14) Light-emitting diode
(15) Red LED
(16) Blue LED
(17) Green LED
(18) Display field
(19) Control and evaluation unit
(20) Computer unit
(D) Axis of rotation
(S) Protected field
(W) Warning zone
(P) Object position

The invention claimed is:

1. Sensor for detecting objects in a monitoring area with a display unit comprising a series of lamps (13) having a linear arrangement of lamps that is situated around an axis of rotation (D) running in parallel to the longitudinal axis of said series of lamps, so as to be capable of rotating at a rotary speed, wherein the series of lamps (13) is controlled via a control unit in such a way that the columns of a matrix-type display field (18) to be presented at a clock rate of the display field are individually output one after the other to the series of lamps (13) and displayed with it, wherein the clock rate is adapted to the rotary speed in such a way that these displays complement one another to form a standing image of the display field (18), characterized in that the sensor is a safety sensor, wherein said sensor has a control and evaluation unit with a redundant structure, comprised of two computer units that mutually monitor one another on a cyclical basis, in which sensor signals generated by a transmitter/receiver unit are evaluated, wherein the display unit is controlled by the control and evaluation unit, wherein the control and evaluation unit generates safe and error-protected output signals via a dual-channel output of said output signals to control the display unit and wherein information relevant for safety is displayed with the display unit, such that an error-proof display of the information relevant for safety is realized via a dual-channel output of this information at the control and evaluation unit.

2. Sensor according to claim 1, characterized in that the clock rate is a whole-number multiple of the rotary speed.

3. Sensor according to claim 1, characterized in that a lamp of the series of lamps (13) is made up of an individual light-emitting diode (14).

4. Sensor according to claim 1, characterized in that a lamp of the series of lamps (13) is made up of a red, a green and a blue light-emitting diode (14).

5. Sensor according to claim 1, characterized in that the matrix-type display field (18) contains text, numbers and/or graphics.

6. Sensor according to claim 1, characterized in that a switching signal is generated in the form of a safe output signal in the transmitter/receiver unit whose switching states indicate whether an object is located in a protected field or not and/or that a warning signal is generated in the form of a safe output signal in the control and evaluation unit whose switching states indicate whether an object is located in a warning zone or not.

7. Sensor according to claim 1, wherein the series of lamps (13) rotate along with the transmitter/receiver unit (6) around the joint axis of rotation (D).

8. Sensor according to claim 1, characterized in that the transmitter/receiver unit (6) forms an optical distance sensor, wherein said transmitter/receiver unit has a transmitter (8) emitting a transmitter light beam (7) and a receiver (10) receiving a receiver light beam (9).

9. Sensor according to claim 1, characterized in that the transmitter/receiver unit (6) and the series of lamps (13) are integrated into a sensing head (2) rotating around the axis of rotation (D).

10. Sensor according to claim 1, characterized in that it is integrated into a housing (3), wherein the series of lamps (13) is arranged in the housing (3).

11. Sensor according to claim 10, characterized in that the display field (18) displayed with the series of lamps (13) is visible through the housing (3).

12. Sensor according to claim 1, characterized in that the entry of an object in the protected field or warning zone is displayed with the display unit.

13. Sensor according to claim 1, characterized in that the position of an object relative to the protected field or warning zone is displayed with the display unit.

14. Sensor according to claim 12, characterized in that the entry of objects is represented by symbols or pictograms.

15. Sensor according to claim 12, characterized in that a graphic representation of the protected field and/or warning zone is provided with the display unit and the entry of objects is visually displayed there.

16. Sensor according to claim 1, characterized in that standing or moving text images are displayed with the display unit.

\* \* \* \* \*